United States Patent
Sakaki

(10) Patent No.: US 7,304,813 B2
(45) Date of Patent: Dec. 4, 2007

(54) OPTICAL IMAGING UNIT

(75) Inventor: Takeshi Sakaki, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/102,019

(22) Filed: Apr. 8, 2005

(65) Prior Publication Data

US 2005/0231830 A1    Oct. 20, 2005

(30) Foreign Application Priority Data

Apr. 20, 2004   (JP)   ............................. 2004-124489

(51) Int. Cl.
*G02B 7/02*   (2006.01)
(52) U.S. Cl. .................. 359/819; 359/811; 359/815
(58) Field of Classification Search ................ 359/819, 359/821, 822, 823, 827, 811, 813, 815
See application file for complete search history.

(56) References Cited

U.S. PATENT DOCUMENTS 5,177,641 A * 1/1993 Kobayashi et al. ......... 359/820

FOREIGN PATENT DOCUMENTS

| CN | 2280923 | 5/1998 |
|---|---|---|
| JP | 2001-75006 | 3/2001 |
| JP | 2004-004566 | * 2/2003 |
| JP | 2004-4566 | 1/2004 |

* cited by examiner

*Primary Examiner*—Ricky Mack
*Assistant Examiner*—Brandi N. Thomas
(74) *Attorney, Agent, or Firm*—Jordan and Hamburg LLP

(57) ABSTRACT

To avoid any lens breakage when a small and wide-angle optical imaging unit is assembled, an optical imaging unit is provided and has a glass lens, a plastic lens, a washer and a lens barrel having a first lens housing groove and a second lens housing groove of larger diameter than the first lens housing groove. The glass lens is mounted in a front side of the lens barrel, a washer is fitted in the second lens housing groove so that the washer contacting with an outer edge of the glass lens, and the plastic lens is mounted in the second lens housing groove behind the washer. The washer or the plastic lens has a recess in a contact side with each other except an outer edge thereof, so that the washer and the plastic lens contact each other along their outer edges.

18 Claims, 2 Drawing Sheets

RELATED ART

OPTICAL IMAGING UNIT

FIELD OF THE INVENTION

This invention relates to an optical imaging unit having a small imaging lens in an imaging device having a solid-state image sensor, such as a CCD type image sensor.

BACKGROUND OF THE INVENTION

While a cellular phone or personal computer having an imaging device has recently become popular, an optical imaging unit used in such a device has been required to be small and yet cover a wide angle of view. A three-lens unit composed of a first lens having a positive refractive power, a second lens having a negative refractive power and a third lens having a positive refractive power, which are arranged in this order from the object side, is known as a small and wide-angle optical unit (see JP-A-2001-75006 (FIG. 1)).

As the disclosure of JP-A-2001-75006 is unsuitable for a reduction in the overall length of the imaging lenses, a still smaller unit has been developed (see JP-A-2004-4566 (FIG. 2)).

In order to make a small and wide-angle unit with two lenses, it has been usual to employ a scratch-resistant glass lens as a first lens 100 on the object side and a second plastic lens 101 behind the first lens 100 and install them in a lens barrel 102, as shown in FIG. 3. The first lens 100 has a small outside diameter and the second lens 101 has a large outside diameter to spread light sharply on the rear side of the first lens 100. Due to the use of the first and second lenses 100 and 101 as described, it has been likely that the forcing of the second lens 101 into the lens barrel 102 may cause moment to occur about the point of its contact with the first lens 100, and that stress may be concentrated on areas designated as A and B in FIG. 3 and cause the second lens 101 to crack or break.

SUMMARY OF THE INVENTION

An object of an illustrative, non-limiting embodiment of the invention is to provide a small and wide-angle optical imaging unit that can be assembled without having any broken lens, etc. Also, the invention is not required to overcome the disadvantage described above (i.e., crack or break of lenses), and an illustrative, non-limiting embodiment of the invention may overcome a different disadvantage or may not overcome any disadvantages.

An optical imaging unit of the invention includes a first lens (e.g., a glass lens) and a second lens (e.g., a plastic lens). The first lens is mounted in a front side of a lens barrel having a first lens housing groove of small diameter formed on the front side and a second lens housing groove of larger diameter formed on a rear side of the lens barrel. A washer is fitted in the second lens housing groove, the washer coming into contact with an edge (or, an outer edge or rim) of a rear surface of the first lens. The second lens is mounted in the second lens housing groove behind the washer. At least one surface of a rear surface of the washer and a front surface of the second lens, the front surface including a contact surface with the washer, has a recess inside an edge of the at least one surface, so that the washer and the second lens come into contact with each other along their edges.

According to the invention, it is possible to prevent a plastic lens from breaking when forced into a lens barrel in an optical imaging unit having a glass and plastic lenses.

According to an embodiment of the present invention there is provided an optical imaging unit comprising first lens member, a second lens member, a lens barrel, and a washer member. The first lens member has a first lens member front surface, a first lens member rear surface, and a first lens member outer diameter. The second lens member has a second lens member outer diameter greater than the first lens member outer diameter, the second lens member has a second lens member front surface including a second lens member front surface outer portion and a second lens member front surface inner portion. The lens barrel has a front side, a rear side, and a front side aperture having a front aperture diameter less than the first lens member diameter. The lens barrel has a first barrel portion defined by a first barrel interior wall having a first barrel interior wall diameter greater than the front aperture diameter and accepting the first lens member outer diameter. The first barrel portion is disposed rearwardly of the front aperture, and the first lens member is disposed at least partially within the first barrel portion. The lens barrel has a second barrel portion defined by a second barrel interior wall having a second barrel interior wall diameter greater than the first barrel interior wall diameter and the first lens member outer diameter. The second barrel interior wall diameter accepts the second lens member outer diameter, and the second lens member is disposed at least partially within the second barrel portion. The washer member is disposed in the second barrel portion and has a washer member aperture smaller in diameter than the first lens member diameter, and a washer member outer diameter greater than the first lens member diameter. The washer member has a washer member rear surface facing toward the second lens member front surface, the washer member rear surface includes a washer member rear surface outer portion and a washer member rear surface inner portion extending radially inward from the washer member rear surface outer portion, and the washer member rear surface outer portion receives retaining force from the second lens member front surface outer portion. The second lens member front surface inner portion is spaced apart from the washer member rear surface inner portion and thereby defines a first clearance distance therebetween. The washer member front surface inner portion faces toward the first lens member rear surface and applies the retaining force to the first lens member rear surface to fixedly position the first lens member in the lens barrel.

In accordance with a feature of the invention, the second lens member may be forcibly fitted into the second barrel portion so as to apply the retaining force to the washer member and to the first lens member via the washer member.

In accordance with a further feature of the invention, the lens barrel has a lateral surface portion extending from the first barrel interior wall to the second barrel interior wall, the washer member has a washer member front surface outer portion extending radially outward from the washer member front surface inner portion, and the washer member front surface outer portion is spaced apart from the lateral surface portion so as to define a second clearance distance.

Yet another feature of the invention optionally includes the second lens member front surface inner portion being recessed to the second lens member front surface outer portion.

Still further, the present invention provides an embodiment wherein the first clearance distance is greater than the second clearance distance, the second lens member front surface outer portion contacts the washer member rear surface outer portion, and the washer member front surface inner portion contacts the first lens member rear surface.

According to another variation of the above referenced invention, the washer member rear surface inner portion is recessed relative the washer member rear surface outer portion. In such a variation the first clearance distance may he set greater than the second clearance distance. Still further, the second lens member front surface outer portion contacts the washer member rear surface outer portion. Additionally, the washer member front surface inner portion contacts the first lens member rear surface. Finally, the washer member front surface inner portion contacts the first lens member rear surface.

DETAILED DESCRIPTION OF THE INVENTION

An exemplary embodiment will now be described with reference to drawings.

Figure 1:
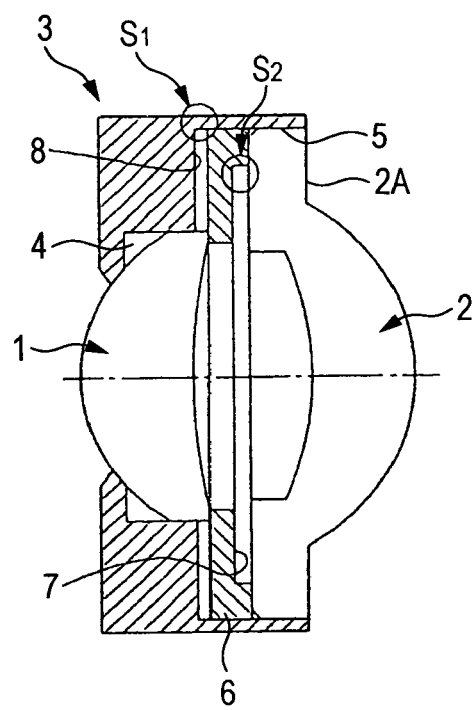
FIG. 1 shows a cross sectional view according to an illustrative, non-limiting embodiment of the invention.

According to an embodiment shown in FIG. 1, there is an optical imaging unit having a glass lens 1 and a plastic lens 2 and a lens barrel 3 in which the two lenses 1 and 2 are mounted has a first lens housing groove 4 of small diameter formed on a front side of the lens barrel 3 and a second lens housing groove 5 of larger diameter formed on its rear side of the lens barrel 4. The glass lens 1 is mounted in the front side of the lens barrel 3 (i.e., the first lens housing groove), and a washer 6 coming into contact with an edge of a rear surface of the glass lens 1 is fitted in the second lens housing groove 5 behind the glass lens 1. The washer 6 has a recess 7 formed on a rear surface thereof except along its edge (i.e., a rear surface inside edge of the washer 6). The glass lens has a diameter of 3 to 5 mm and the plastic lens has a diameter of 6 to 8 mm. A clearance S2 defined by the recess 7 between the washer 6 and the plastic lens 2 is greater than a clearance S1 defined between a front lateral surface 8 of the second lens housing groove 5 (i.e., a surface 8 between the first and second lens housing grooves 4 and 5) and the washer 6 when the glass lens 1 and the washer 6 are in contact with each other. The smaller the unit in size, the smaller the washer is in thickness, and when the plastic lens 2 is forced into the lens barrel 3, the washer 6 may be deformed by that force, but as the clearance S2 is greater than the clearance S1, the edge of the washer 6 comes into contact with the surface 8 between the first and second lens housing grooves 4 and 5 in the lens barrel 3 at the same time as the edge of the plastic lens 2 (this means that when the plastic lens 2 is forced into the lens barrel 3, a central side (a lens center side) of a flange 2A of the plastic lens 2 does not come into contact with the washer 6 since the clearance S2 is greater than the clearance S1), and there does not occur any such moment as stated in connection with the related art, but it is reliably possible to prevent any cracking or damaging of the plastic lens 2. The washer 6 usually has a thickness of about 0.4 mm (as measured across its edge) and the clearance S2 is about 0.15 mm.

Figure 2:
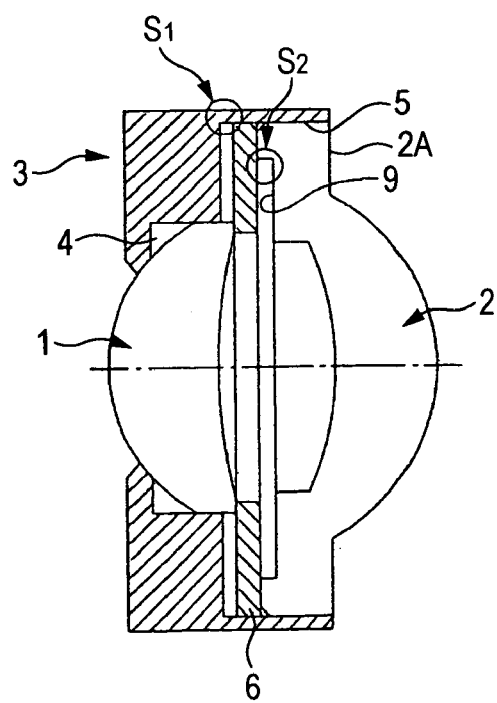
FIG. 2 shows a cross sectional view showing another illustrative, non-limiting embodiment of the invention.
Figure 3:
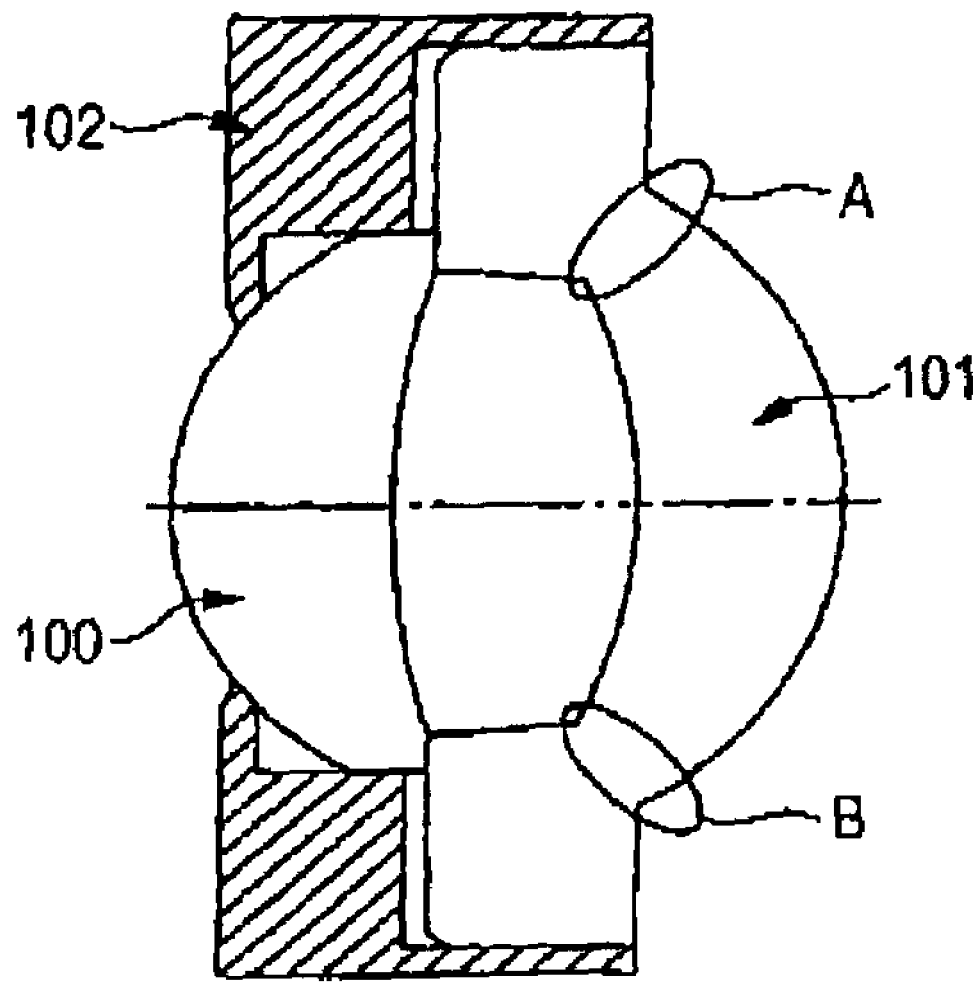
FIG. 3 shows a cross sectional view according to the related art.

FIG. 2 shows an optical imaging unit of another embodiment of the invention, in which a plastic lens 2 has a recess 9 formed on a front surface thereof (i.e., a surface facing a washer 6) except along edge thereof, while the washer 6 does not have any recess 7.

In both of embodiments, the plastic lens 2 is required to have a larger outside diameter than the glass lens 1, and when an outer edge of the flange 2A formed outside the effective lens diameter comes into contact with the washer 6, the clearance $S_2$ is formed between a central side of the flange 2A and the washer 6.

The entire disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. An optical imaging unit comprising:
   a lens barrel having a first lens housing barrel interior portion at a front side of the lens barrel and a second lens housing barrel interior portion at a rear side of the lens barrel, the second lens housing barrel interior portion having a larger diameter than the first lens housing barrel interior portion;
   a first lens body mounted in the first lens housing barrel interior portion and having a first lens body front surface facing toward the front side of the lens barrel and a first lens body rear surface facing the rear side of the lens barrel, said first lens body rear surface including a first lens body outer peripheral edge at an outer periphery of said first lens body rear surface which is a rearmost surface of said first lens body;
   a washer fitted in the second lens housing barrel interior portion, the washer having a washer front surface coming into contact with said first lens body outer peripheral edge of the first lens body;
   a second lens body mounted in the second lens housing barrel interior portion behind the washer, said second lens body having a second lens body front surface facing toward the front side of the lens barrel and including a second lens body front surface outer peripheral edge which is at a forefront of the second lens body front surface; and
   said washer having a washer rear surface having a washer outer peripheral edge portion which contacts the second lens body front surface outer peripheral edge;
   wherein
   at least one surface of said washer rear surface and said second lens body front surface has a recess radially inside of said washer outer peripheral edge portion and the second lens body front surface outer peripheral edge.

2. The optical imaging unit according to claim 1, wherein the first lens body has a diameter 3 to 5 mm, and the second lens has a diameter of 6 to 8 mm.

3. The optical imaging unit according to claim 1, wherein the recess defines a clearance, between the washer and the second lens body, the clearance being greater than a clearance defined between said washer front surface and a front lateral surface of the second lens housing barrel interior portion.

4. The imaging optical unit according to claim 1, wherein the first lens body is a glass lens.

5. The imaging optical unit according to claim 1, wherein the second lens body is a plastic lens.

6. An optical imaging unit comprising:
a first lens in member having a first lens member front surface, a first lens member rear surface, and a first lens member outer diameter;
a second lens member having a second lens member outer diameter greater than said first lens member outer diameter, said second lens member having a second lens member front surface including a second lens member front surface outer portion and a second lens member front surface inner portion;
a lens barrel having a front side, a rear side, and a front side aperture having a front aperture diameter less than said first lens member diameter;
said lens barrel having a first barrel portion defined by a first barrel interior wall having a first barrel interior wall diameter greater than said front aperture diameter and accepting said first lens member outer diameter, said first barrel portion being disposed rearwardly of said front aperture, said first lens member being disposed at least partially within said first barrel portion;
said lens barrel having second barrel portion defined by a second barrel interior wall having a second barrel interior wall diameter greater than said first barrel interior wall diameter and said first lens member outer diameter, said second barrel interior wall diameter accepting said second lens member outer diameter, said second lens member being disposed at least partially within said second barrel portion;
a washer member disposed in said second barrel portion and having a washer member aperture smaller in diameter than said first lens member diameter, and a washer member outer diameter greater than said first lens member diameter;
said washer member having a washer member rear surface facing toward said second lens member front surface, said washer member rear surface including a washer member rear surface outer portion and a washer member rear surface inner portion extending radially inward from said washer member rear surface outer portion, and said washer member rear surface outer portion receiving retaining force from said second lens member front surface outer portion;
said second lens member front surface inner portion being spaced apart from said washer member rear surface inner portion and thereby defining a first clearance distance therebetween; and
said washer member front surface inner portion facing toward said first lens member rear surface and applying said retaining force to said first lens member rear surface to fixedly position said first lens member in the lens barrel.

7. The optical imaging unit according to claim 6, wherein said second lens member is forcibly fitted into said second barrel portion so as to apply said retaining force to said washer member and to said first lens member via said washer member.

8. The optical imaging unit according to claim 7, wherein;
said lens barrel has a lateral surface portion extending from said first barrel interior wall to said second barrel interior wall;
said washer member has a washer member front surface outer portion extending radially outward from said washer member front surface inner portion; and
said washer member front surface outer portion is spaced apart from said lateral surface portion so as to define a second clearance distance.

9. The optical imaging unit according to claim 8, wherein said second lens member front surface inner portion is recessed to said second lens member front surface outer portion.

10. The optical imaging unit according to claim 9, wherein said first clearance distance is greater than said second clearance distance.

11. The optical imaging unit according to claim 10, wherein said second lens member front surface outer portion contacts said washer member rear surface outer portion.

12. The optical imaging unit according to claim 11, wherein said washer member front surface inner portion contacts said first lens member rear surface.

13. The optical imaging unit according to claim 10, wherein said washer member front surface inner portion contacts said first lens member rear surface.

14. The optical imaging unit according to claim 8, wherein said washer member rear surface inner portion is recessed relative said washer member rear surface outer portion.

15. The optical imaging unit according to claim 14, wherein said first clearance distance is greater than said second clearance distance.

16. The optical imaging unit according to claim 15, wherein said second lens member her front surface outer portion contacts said washer member rear surface outer portion.

17. The optical imaging unit according to claim 16, wherein said washer member front surface inner portion contacts said first lens member rear surface.

18. The optical imaging unit according to claim 15, wherein said washer member front surface inner portion contacts said first lens member rear surface.

* * * * *